United States Patent
Lill

(10) Patent No.: US 9,604,596 B2
(45) Date of Patent: Mar. 28, 2017

(54) IGNITION LOCK MECHANISM

(71) Applicant: International Truck Intellectual Property Company, LLC, Lisle, IL (US)

(72) Inventor: Mark Paul Lill, Elgin, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/777,026

(22) PCT Filed: Mar. 22, 2013

(86) PCT No.: PCT/US2013/033537
§ 371 (c)(1),
(2) Date: Sep. 15, 2015

(87) PCT Pub. No.: WO2014/149057
PCT Pub. Date: Sep. 25, 2014

(65) Prior Publication Data
US 2016/0039388 A1    Feb. 11, 2016

(51) Int. Cl.
| | |
|---|---|
| B60R 25/04 | (2013.01) |
| H01H 27/06 | (2006.01) |
| E05B 9/04 | (2006.01) |
| E05B 17/00 | (2006.01) |
| B60R 25/34 | (2013.01) |

(Continued)

(52) U.S. Cl.
CPC .............. *B60R 25/04* (2013.01); *B60R 25/34* (2013.01); *E05B 9/04* (2013.01); *E05B 17/0062* (2013.01); *E05B 85/00* (2013.01); *H01H 27/06* (2013.01); *E05B 2047/0048* (2013.01); *E05B 2047/0072* (2013.01); *E05B 2047/0093* (2013.01); *H01H 2027/066* (2013.01)

(58) Field of Classification Search
CPC ............ H01H 27/06; H01H 2239/032; H01H 2027/066; B60R 25/04; B60R 25/34; E05B 9/04; E05B 17/0062
USPC ................ 200/61.08, 43.08, 43.03, 51.17
See application file for complete search history.

(56) References Cited

U.S. PATENT DOCUMENTS 3,306,291 A * 2/1967 Burke .................. A61M 5/178
                                                     206/365
3,651,329 A    3/1972 Marlowe et al.

(Continued)

OTHER PUBLICATIONS

PCT Search Report from parent application WO/2014/149057.
PCT Preliminary Patentability Report from parent application WO/2014/149057.

*Primary Examiner* — Felix O Figueroa
(74) *Attorney, Agent, or Firm* — Jeffrey P. Calfa; Mark C. Bach

(57) ABSTRACT

A lock mechanism for a motor vehicle ignition switch includes a housing defining a barrel and a locking cylinder fitted for rotation in the barrel. A cap is fitted over one end of the housing capturing a frangible lock insert between the housing and cap. The frangible lock insert includes an electrically conductive pathway between radially displaced connection points on the rim of the insert. A circuit includes the electrically conductive pathway which is interrupted by disintegration of the frangible lock insert. Such disintegration occurs upon efforts to tamper with the lock mechanism or application of brute force to the sensor.

5 Claims, 3 Drawing Sheets

(51) Int. Cl.
*E05B 85/00* (2014.01)
*E05B 47/00* (2006.01)

(56) References Cited

U.S. PATENT DOCUMENTS

| | | | |
|---|---|---|---|
| 4,008,588 A | | 2/1977 | Miller et al. |
| 4,074,547 A | | 2/1978 | Seidewand |
| 4,074,548 A | | 2/1978 | Milton |
| 4,301,668 A | | 11/1981 | Renz |
| 4,981,026 A | | 1/1991 | Sakuno et al. |
| 5,186,031 A | | 2/1993 | Janssen et al. |
| 5,441,022 A | | 8/1995 | Yoder et al. |
| 5,611,225 A | | 3/1997 | Resch et al. |
| 5,793,122 A | * | 8/1998 | Dingwall ............... B60R 25/04 200/61.08 |
| 6,756,698 B2 | | 6/2004 | Shamoto et al. |
| 6,778,083 B2 | * | 8/2004 | Auerbach ............... E05B 39/02 340/539.1 |
| 6,958,551 B2 | | 10/2005 | Janssen |

\* cited by examiner

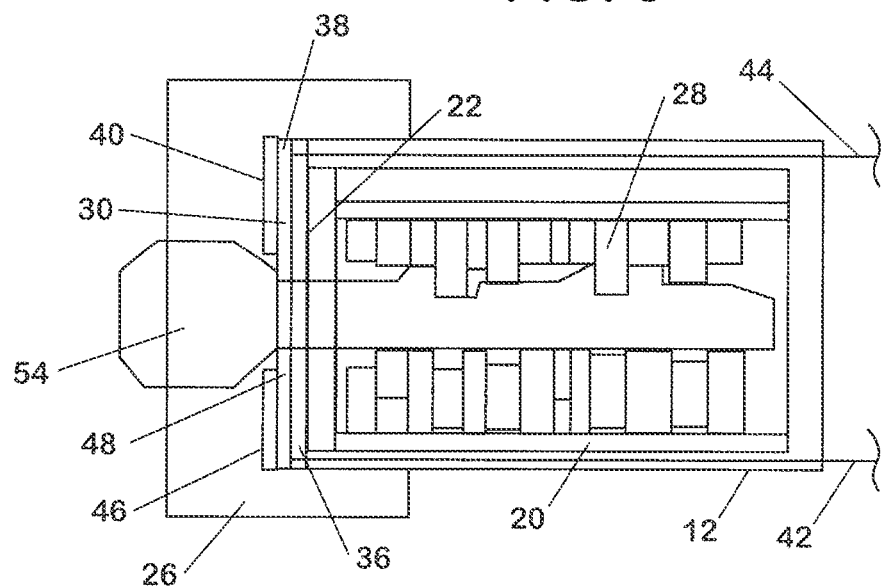
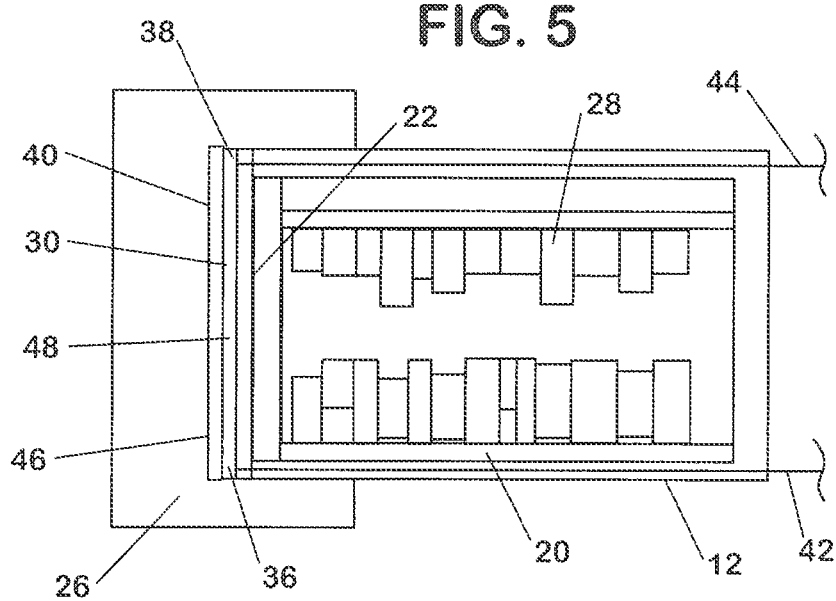

IGNITION LOCK MECHANISM

BACKGROUND

The field relates to motor vehicle ignition locks.

A common type of motor vehicle ignition lock is a key-operated ignition switch system has a cylinder lock with a barrel and a slot along the long axis of the barrel through and into which a mechanical key inserts. If the key is valid, the pattern that has been cut into an edge of its shaft to create the key's teeth sets the lock tumblers to free them from locking engagement with the barrel. This allows the barrel to rotate when the base of the key is turned. The barrel can then be rotated from the Lock position between the various ignition switch positions including to Accessory, On (Ignition), and Start positions to connect various branch circuits of the vehicle's electrical system to the vehicle's electric power supply as well as back to the OFF position.

The ignition switch allows a connection to be established from the battery to a starter motor for cranking the starter motor to start an engine. It also controls delivery of power to a vehicle system bus independently of its use in starting the vehicle engine. This prevents inadvertent energization of circuits and prevents accessories connected to a vehicle system bus from running down the battery when the vehicle is parked for an extended period of time with an accessory switch left closed.

This ignition lock system has however proven vulnerable to car thieves. A skilled thief can often "hot wire" an automobile or truck in manner of a few seconds. Typically, the key and cylinder lock is either bypassed or pulled in order to carry out a theft. To combat this automotive manufacturers have incorporated a variety of vehicle anti-tampering systems. U.S. Pat. No. 5,186,031 for example provided an electronic interlock system which was constructed to be disabled when the lock cylinder was forcibly removed from its sleeve, which is a common initial action in attempting an unauthorized start of a vehicle. The '031 patent provided an interlock circuit part of which was disposed on a frangible base which was destructed upon forcible removal of the lock cylinder from its sleeve.

SUMMARY

A lock mechanism for a motor vehicle ignition switch, comprising a housing defining a barrel, a rim to the housing defining a cylindrical opening to the barrel, a locking cylinder fitted for rotation in the barrel, a frangible lock insert having body, an outer edge around the body, a central aperture in the body, and an electrically conductive pathway between the first tab and the second tab, a cap matingly engaging the housing and capturing the frangible lock insert between the housing and the cap, and a circuit including the electrically conductive pathway which is interrupted by disintegration of the frangible lock insert.

BRIEF DESCRIPTION OF THE DRAWINGS

FIG. 5 is cross-sectional view of an ignition switch; and

FIG. 6 is a cross-sectional view of an ignition switch with a key inserted.

DETAILED DESCRIPTION

Figure 1:
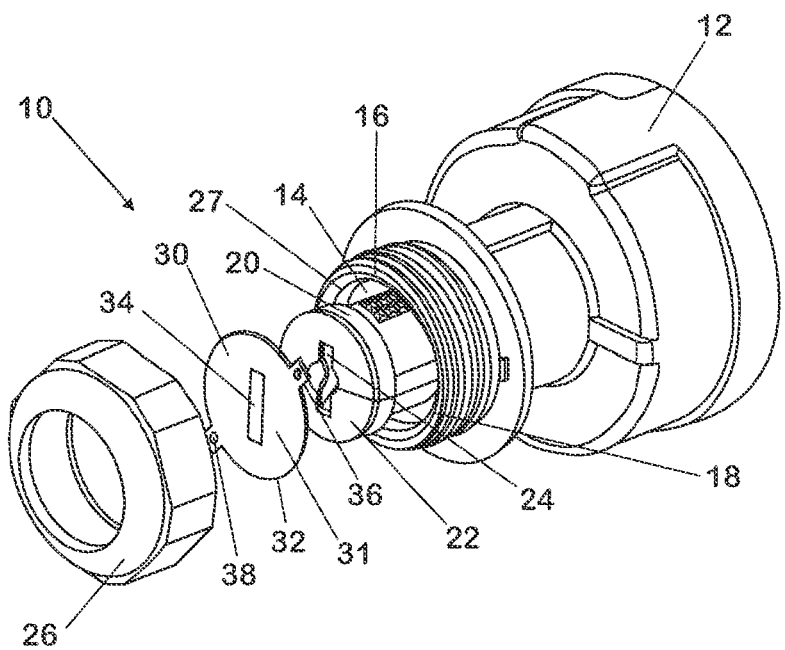
FIG. 1 is an exploded perspective view of an ignition switch.
Figure 2:
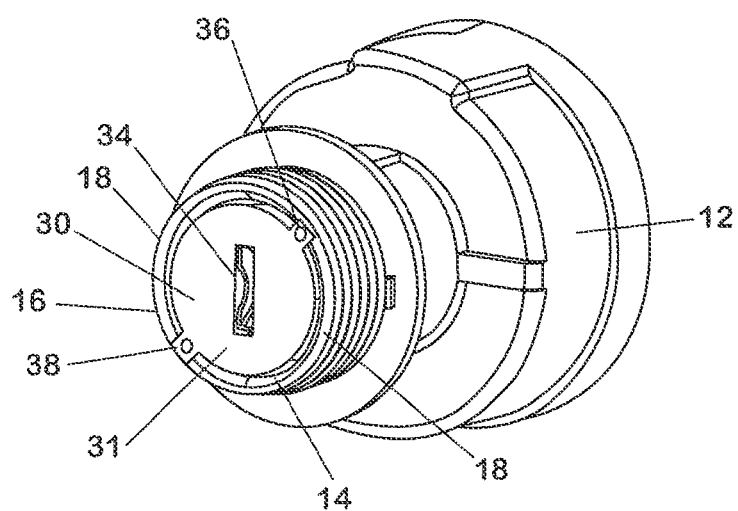
FIG. 2 is perspective view of an ignition switch with the cap removed.
Figure 3:
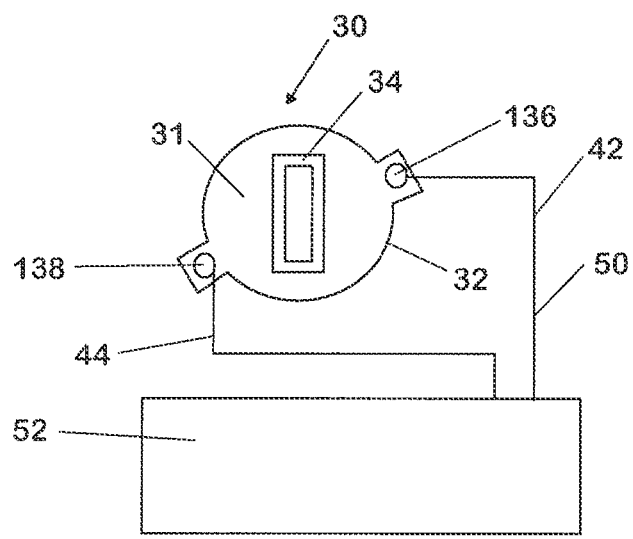
FIG. 3 is a front view of a frangible lock insert circuit.
Figure 4:
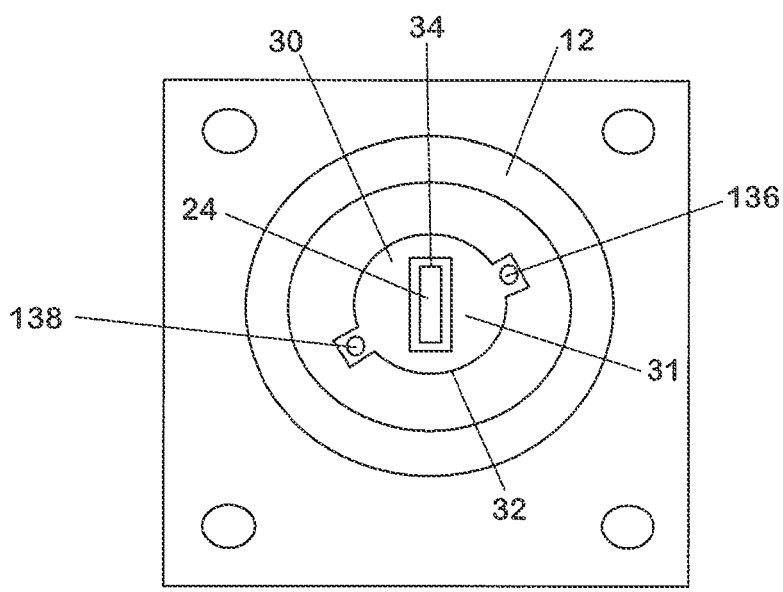
FIG. 4 is a front view of an ignition switch installed in a motor vehicle with the cap removed.

Turning to the Figures, FIG. 1 shows an ignition switch 10 designed to be mounted in an opening in an instrument panel of a motor vehicle. The housing 12 can contain components (such as a key reader) relating to reading an electronic or a mechanical key upon insertion and other components relating to the ignition of a motor vehicle. The key reader can read a code on an inserted key and supply a coded electrical signal to an electronic control module (ECM) for the ignition system, which in turn decodes the signal. The ECM then can control application of power to other parts of the ignition system to start the motor.

Housing 12 defines a barrel 14. A rim 16 surrounds a cylindrical opening to the barrel 14. Disposed around rim 16 is a pair of stoppers 18 located at opposed locations on the rim.

A locking cylinder/mechanism 20 inserts lengthwise through the cylindrical opening into barrel 14 so that the locking cylinder/mechanism and barrel are co-axially aligned allowing the locking cylinder to rotate in the barrel upon insertion of a key or comparable tool. The locking mechanism 20 has a front face 22 and a keyhole 24 to allow the insertion of an associated key. The locking mechanism 20 can connect with a key reader to decode a code on an electronic key. Alternatively, the locking mechanism 20 can be a mechanical system using tumblers or discs 28 which fall into place upon the insertion and rotation of a key 54 within the locking mechanism 20. When the tumblers or discs align correctly with the key 54, the locking mechanism 20 turns to activate the ignition system.

A frangible lock insert 30 is located outside of the rim 16 of the housing 12 captured between the rim and cap 26. The frangible lock insert 30 has a body 31, an outer edge 32 and a central aperture 34 in the body 31 that aligns with the keyhole 24 of the locking mechanism 20. First and second tabs 36, 38 extend outwardly from the outer edge 32 and engage the rim 16 of the housing 12. The frangible lock insert 30 roughly abuts the front face 22 of the locking mechanism 20. It is bound to the face of the barrel using spot application of epoxy and in normal use rotates with locking mechanism.

Frangible lock insert 30 is built on non-conductive substrate 48 which is a fabricated from a strong, brittle material such as a ceramic or glass. In a typical application the substrate 48 is about 1/50,000 of an inch in thickness. Non-conductive substrate 48 can be fabricated to retain substantial residual (thermal) stress at the usual environmental conditions that a vehicle will encounter. Application of sufficient physical shock such as encountered by attempts to twist a cylinder lock by insertion of a probe, screw driver, or drill will cause the substrate not only to fracture, but to shatter into small pieces or powder under influence of the residual stress.

A thin conductive layer or layers 46 of electrically conductive material is applied to the non-conductive substrate 48 to provide an electrically conductive pathway 40. Layer 46 is typically a sputter deposition of a metal such as nickel or tin. Deposition depth is on the order of 10,000 angstroms so that the deposition loses all integrity on shattering of the substrate 48.

The first tab 36, the second tab 38 and the rest of the frangible lock insert 30 can be formed of the same material. The first and second tabs 36, 38 can be scored to facilitate fracture. Electrically conductive pathway 40 extends to the first tab 36 and the second tab 38, which double as sense points for the external attachment of wires 42, 44 through tab holes 136, 138.

A first wire 42 extends from the first tab 36 and a second wire 44 extends from the second tab 38 to complete an insert circuit 50 in communication with the ECM 52 for the ignition system. The ECM 52 can be programmed to determine whether the electrically conductive pathway 40 of the insert circuit 50 is intact. Either an open or a short circuit may be taken to indicate interruption of the electrically conductive pathway.

The frangible lock insert 30 is affixed to front face 22 by two or spot applications of epoxy so that the insert rotates with the locking mechanism 20.

A cap 26 matingly engages the housing 12 and covers at least part of the frangible lock insert 30. An opening 27 through cap 26 allows insertion of a key into locking mechanism 20 but prevents removal of frangible lock insert 30. The cap 26 can allow the frangible lock insert 30 some movement away from the front face 22 of the locking mechanism 20. Pulling out the ignition switch 10 with excessive force, however, would force the frangible lock insert 30 forward against the cap 26 and away from the locking mechanism 20. The frangible lock insert 30 then disintegrates and the insert circuit 50 opens.

The frangible lock insert 30 is allowed to partially rotate. The first and second tabs 36, 38 slide along the rim 16 of the housing 12 until reaching at least one stopper 18. Continued rotation forces at least one of the first and second tabs 36, 38 against the stopper 18. Additional force asserted, such as when trying to remove the ignition switch 10, would force at least one of the first and second tabs 36, 38 against the stopper 18 and fracture the tab. The fracture of the tab would open the insert circuit 50.

If the ECM 52 receives a signal to start the engine, the ECM 52 can determine if the insert circuit 50 is open or closed. When the insert circuit 50 is determined to be open, the ECM 52 prevents the engine from starting. The insert circuit 50 can be read by a reader located within the housing 12 which communicates to the ECM the state of the insert circuit 50 or the insert circuit 50 can be read directly by the ECM. If the insert circuit 50 is open due to the disintegration or loss of the frangible lock insert 30, the motor vehicle will not start.

What is claimed:

1. A lock mechanism for a motor vehicle ignition switch, comprising:
   a housing defining a barrel;
   a rim to the housing defining a cylindrical opening to the barrel;
   a locking cylinder fitted for rotation in the barrel;
   a frangible lock insert having a non-conductive body, an outer edge around the body and a central aperture through the non-conductive body;
   an electrically conductive pathway disposed on the non-conductive body;
   a cap matingly engaging the housing and capturing the frangible lock insert between the housing and the cap;
   a circuit including the electrically conductive pathway which is interrupted by disintegration of the frangible lock insert upon application of extractive force urging the frangible lock insert against the cap;
   the non-conductive body being under residual stress to promote shattering upon application of an outside shock;
   at least a first tab extending outwardly from the outer edge; and
   the rim having at least one stop located on the rim;
   the frangible lock insert being rotatable to bring the at least first tab into contact with the stop against which it breaks upon application of sufficient rotative force.

2. The lock mechanism of claim 1, further comprising:
   a second tab extending outwardly from the outer edge; and
   the electrically conductive pathway being disposed between the first tab and the second tab.

3. The lock mechanism of claim 2, further comprising:
   the cap retaining the frangible lock insert loosely against the rim of the housing.

4. A lock mechanism for a motor vehicle ignition switch, the lock mechanism comprising:
   a housing defining a barrel;
   a locking cylinder fitted for rotation in the barrel leaving an exposed end of the locking cylinder;
   a frangible, non-conductive body located adjacent the housing and proximate to the exposed end of the locking cylinder;
   a cap fitted over an end of the housing corresponding the exposed end of the locking cylinder for capturing the frangible lock insert between the housing and cap;
   an electrically conductive pathway disposed on the frangible, non-conductive body, the electrically conductive path being continuous between radially displaced connection points on a rim of the frangible lock insert;
   a circuit including the electrically conductive pathway;
   a rim to the housing defining an opening to the barrel;
   at least a first stop extending from the rim in the direction of the cap;
   the non-conductive body having an outer edge; and
   at least a first tab extending outwardly from the impinging against the at least first stop upon rotation of the non-conductive body in relation to the housing.

5. The lock mechanism of claim 4, further comprising:
   the electrically conductive pathway including a contact in the at least first tab allowing the electrically conductive pathway to be interrupted by disintegration of the non-conductive body by loss of the at least first tab.

\* \* \* \* \*